United States Patent [19]

Marsden et al.

[11] 4,340,520

[45] Jul. 20, 1982

[54] POLYESTER AMINOORGANOSILANE SALT/POLYALKYLENE OXIDE COMPOSITIONS FOR IMPROVED GLASS FIBER TREATMENT

[75] Inventors: James G. Marsden; Enrico J. Pepe, both of Amawalk, N.Y.

[73] Assignee: Union Carbide Corporation, Danbury, Conn.

[21] Appl. No.: 226,551

[22] Filed: Jan. 21, 1981

Related U.S. Application Data

[63] Continuation-in-part of Ser. No. 163,628, Jun. 27, 1980, abandoned.

[51] Int. Cl.$^3$ .................. C08G 63/54; C08K 3/40; C08L 67/06

[52] U.S. Cl. .................. 523/209; 428/429; 428/430; 525/440; 525/446; 525/447; 524/376; 524/377; 524/604; 524/605

[58] Field of Search .................. 525/1, 446, 447; 260/29.2 UA, 40 R

[56] References Cited

U.S. PATENT DOCUMENTS

| | | | |
|---|---|---|---|
| 2,798,020 | 7/1957 | Balz et al. | 525/1 |
| 3,658,571 | 4/1972 | Marzocchi | 117/65.2 |
| 3,728,146 | 4/1973 | Marzocchi | 117/72 |
| 4,122,074 | 10/1978 | Pepe et al. | 526/26 |
| 4,163,073 | 7/1979 | Pepe et al. | 427/221 |

Primary Examiner—Wilbert J. Briggs, Sr.
Attorney, Agent, or Firm—Paul W. Leuzzi, II

[57] ABSTRACT

This invention relates to the treatment of glass fibers and to compositions suitable for use in the treatment of glass fibers which comprise acid salts of polyester aminoorganosilanes and polyalkylene oxide polymers.

10 Claims, No Drawings

POLYESTER AMINOORGANOSILANE SALT/POLYALKYLENE OXIDE COMPOSITIONS FOR IMPROVED GLASS FIBER TREATMENT

CROSS-REFERENCE TO RELATED APPLICATIONS

This is a continuation-in-part of U.S. patent application Ser. No. 163,628, which was filed on June 27, 1980 and is now abandoned.

U.S. patent application Ser. No. 136,362, filed on Apr. 1, 1980, discloses certain strong mineral acid salts of polyester aminoorganosilanes which are useful for treating glass fibers used as reinforcement in organic resins.

BACKGROUND OF THE INVENTION

1. Field of the Invention

This invention relates generally to the reinforcement of organic resins with glass fibers, and in particular to means for (1) "sizing" or protecting the glass fiber reinforcement and (2) promoting adhesion between the glass fiber reinforcement and the organic resin, by way of novel compositions comprising polyester amino organosilane acid salts admixed with certain polyalkylene oxide polymers.

2. Description of the Prior Art

The reinforcement of organic resin with glass fibers, and the use of organosilane adhesion promoters in connection therewith has long been known; see e.g. U.S. Pat. No. 4,122,074 and references cited therein.

U.S. Pat. No. 4,122,074 (see also its divisional: U.S. Pat. No. 4,163,073) discloses that certain polyester aminoalkylalkoxysilane organic acid salts may be used to render inorganic siliceous materials in general, and glass fibers in particular, compatible with and adherent to organic resins. U.S. patent application Ser. No. 136,362, filed on Apr. 1, 1980, discloses that certain polyester aminoalkylalkoxysilane strong mineral acid salts may likewise be so used.

U.S. Pat. Nos. 3,658,571 and 3,728,146 both show "conventional" glass sizing compositions which contain gamma-aminopropyltriethoxysilane. In one instance, the glass sizing composition contains a polyglycol condensate having a molecular weight of 300–400, but no reason is given for its presence.

SUMMARY OF THE INVENTION

Two particularly important characteristics of the handling properties of treated glass fibers intended for use as reinforcement in organic resins are (1) stiffness and (2) a low degree of extractability of the treatment agent. The present invention is based upon the discovery that such handling characteristics can be obtained to a satisfactory degree by utilizing as glass fiber treatment agents compositions which comprise acid salts of aminoorganosilanes, as described in the above-mentioned U.S. Pat. No. 4,122,074 and U.S. patent application Ser. No. 136,362, combined with certain polyalkylene oxide polymers, a discovery which is not suggested by the prior art.

DESCRIPTION OF THE PREFERRED EMBODIMENTS

The polyester aminoorganosilane acids salts which can be utilized to the present invention are polymers having molecular weights of greater than about 1000 comprising units of the formulae

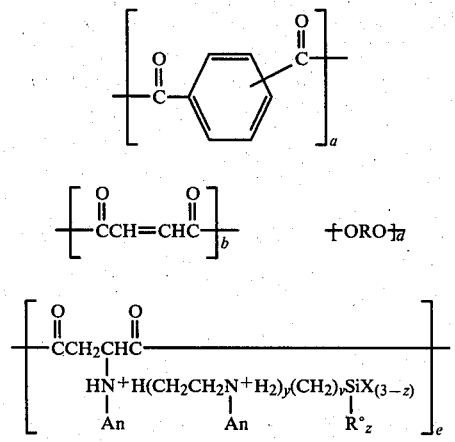

wherein R is a divalent hydrocarbon radical, and is preferably an alkylene radical having from 2 to 6 carbon atoms such as 1,2-propylene, $R°$ is an alkyl, aryl, or aralkyl group, X is alkoxy, hydroxy, or divalent oxygen, and is preferably an alkoxy group having up to 8 carbon atoms such as methoxy and ethoxy, y is 0 or 1, v is an integer of from 1 to 6, z is 2, 1, or preferably 0, a is 0 or is preferably a mole fraction of from 0.004 to 0.6, b and e are mole fractions ranging from about 0.004 to about 0.6, and d is a mole fraction ranging from 0.4 to 0.6, with the proviso that d is greater than, equal to, or slightly less than the sum of a, b, and e, and An is an anion of a monovalent acid, and is preferably that of a strong acid such as hydrochloric acid. X can be a hydroxy and/or divalent oxygen as indicated above due to random hydrolysis which results in Si-OH moieties and/or to random condensation, which results in Si-O-Si bonding. Such polymers are polyesters wherein each of the available carbonyl radical valences is satisfied by a valence of an —ORO— radical or by a hydroxyl group.

Polyester aminoorganosilanes according to the present invention can be prepared by way of a Michael addition of an appropriate aminoorganosilane to an appropriate unsaturated conjugated polyester.

Appropriate unsaturated conjugated polyesters have molecular weights of at least 1000 and comprise units of the formulae

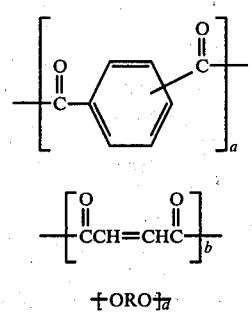

wherein R, a, b, and d are as defined above. Such polyesters are readily available and can be obtained as described in U.S. Pat. No. 4,122,074. For the purpose of preparing high molecular weight polyesters, i.e., those wherein the molecular weight is above 5000, such readily available polyesters can be chain-extended with organic diisocyanates in a manner fully disclosed in U.S. Pat. No. 4,122,074. In such cases the polyesters and their acid salt derivatives will contain residues of such diisocyanate Appropriate aminoorganosilanes are those of the formula $$H_2N(CH_2CH_2NH)_y(CH_2)_vSiX_{(3-z)}R^\circ_z$$

wherein X, R°, y, v, and z are as defined above. The most preferred aminoorganosilane is gamma-aminopropyltriethoxysilane.

The Michael addition reaction which is practiced in connection with the present invention is carried out as follows: an appropriate unsaturated polyester resin as described above is dissolved in the monomethyl ether of ethylene glycol to give a 65 weight percent solution of the resin. The water content of the solution is adjusted to 0.35 percent. The solution is heated to and maintained at 75° C. and an appropriate aminoorganosilane as described above is then added to the solution dropwise. The solution is agitated throughout the dropwise addition of the aminoorganosilane. After all of the aminoorganosilane has been added, the solution is cooled to ambient temperature. At this point the acid, which is anhydrous and is dissolved in the monomethylether of ethylene glycol, is added to the solution. The amount of acid utilized is that which is necessary to react completely with all of the amino groups which have been added to the polyester resin by its reaction with the aminoorganosilane.

The polyalkylene oxide polymers which can be utilized according to the present invention may be all-ethylene oxide based, all-propylene oxide based, or mixed ethylene oxide/propylene oxide based polymers. They may be alkoxy-terminated. Their molecular weight can vary widely, so long as they do not become too viscous to work with. Polyalkylene oxide polymer compositions as used may contain small amounts of additives such as antioxidants.

A class of polyoxyalkylene oxide polymers suitable for use according to the present invention may be represented by the formula $$EO[CH_2CH_2O]_m[CH(CH_3)CH_2O]_nH$$

wherein E is hydrogen or an alkyl end-blocking group having up to 8 carbon atoms such as n-butyl, m ranges from 0 to 50, preferably up to 25, n ranges from 0 to 20, preferably up to 10, and m+n must total at least 3, preferably from 3 to 35. Currently preferred is an ethylene oxide polymer which has the following approximate composition:

$$CH_3O(CH_2CH_2O)_{7.2}H$$

In making up the compositions according to the present invention, the amount of polyalkylene oxide polymer which should be employed relative to the amount of polyester aminoorganosilane acid salt employed can range from about 10 parts by weight to about 100 parts weight per 100 parts by weight polyester aminoorganosilane. Ten parts by weight polyalkylene oxide polymer to 61.2 parts by weight polyester aminoorganosilane has been found to be an efficacious ratio.

Compositions according to the present invention can be conveniently prepared by preparing a solution of the polyester aminoorganosilane acid salt in the monomethyl ether of ethylene glycol as described above, then determining the weight percent of the polyester aminoorganosilane in said solution, then admixing therewith from about 10% to about 100% of said weight percent of an appropriate polyalkylene oxide polymer with said solution.

A treating solution according to the present invention can be prepared by adding to water with stirring either a composition prepared as described above or the individual components in appropriate ratios of a composition according to the invention, in order to produce a stable dispersion. A treating solution according to the invention will conveniently contain from about 1 weight % to about 20 weight % of a composition according to the invention.

Glass fiber can be sized according to the present invention by passing it through a bath of the treating solution and then drying or "curing" it in air. While we do not wish to be bound by theory, it is believed that the polyalkylene oxide polymer and the polyester aminoorganosilane acid salt interact as follows: (1) during the curing step, the polyoxyalkylene polymer undergoes oxidative attack with the formation of free radicals, (2) the radicals on the polyalkylene oxide graft to the polyester aminoorganosilane acid salt, and (3) multiple occurrences of (1) and (2) provide a cross-linked copolymer of polyalkylene oxide and polyester aminoorganosilane acid salt. This cross-linked copolymer presumably provides the increased stiffness to the treated glass fibers and reduces the extractability of the treatment agent. The polyoxyalkylene polymer and even other materials could be made to graft to the polyester aminoorganosilane acid salt more efficiently or at a lower temperature by the use of ancillary substances which either form or catalyze the formation of free radicals.

Glass fibers treated by the process of the present invention are particularly suitable for use in preparing SMC (sheet molding compounds) composites. SMC composites are generally based primarily upon unsaturated polyester resins, to which are added glass fibers for reinforcement, fillers, and curing agents such as magnesium oxides or hydroxides and peroxides.

EXAMPLES

The following specific examples illustrate the present invention.

Product A

A solution was prepared in a 22 liter 3-necked flask equipped with a mechanical stirrer, a heating mantle, a dropping-funnel, a thermometer attached to an automatic heat control switch, and a water condenser protected at the exit-port by a dry-nitrogen by-pass. The flask was charged with 14,584.6 grams of a 65 weight-percent aqueous solution of a polyester resin product of the formula $$HOCH(CH_3)CH_2O[C(O)CH=CH-C(O)OCH_2CH(CH_3)O]_{21}H$$

in the momomethyl ether of ethylene glycol. In addition to the water already present at this stage, 45 grams more of water was added to achieved the target level of 0.35 weight-percent water. The solution was heated to 75° C. Then, 1,252.5 grams of gamma-aminopropyltriethoxysilane was added to the solution dropwise over a period of 4.75 hours with maximum agitation throughout. After a further 0.5 hour period at 75° C., the reaction mixture was cooled to about 25° C. over a period of 2.5 hours. Then, 206.6 grams of anhydrous hydrogen chloride dissolved in 1.549 grams of the monomethyl ether of ethylene glycol was rapidly added with moderate stirring over a period of few minutes. The result is 18,537.7 grams of an amber to red solution (Product A) containing polyester aminopropyltriethoxysilane (61.2 weight %) present as the hydrochloride in the monomethyl ether of ethylene glycol.

Treating Solution A

A treating solution containing 3 weight % of the polyester aminopropyltriethoxysilane hydrochloride prepared as described above was made by, first, weighing out 61.8 grams of distilled water into a 6 ounce bottle, adding thereto 30 grams of Product A and stirring for 5 minutes, then weighing out 340 grams of distilled water in a 16 ounce bottle, adding thereto 60 grams of the Product A dispersion prepared as described in the first step, and stirring for an additional 5 minutes to provide treating Solution A.

Product B

A polyalkylene oxide polymer of the average formula $C_4H_9O[CH_2CH_2O]_{3.7}[CH_2(CH_3)CH_2O]_{2.8}H$ was added, in an amount calculated to result in a polyalkylene oxide polymer:polyester aminopropyltriethoxysilane hydrochloride solids weight ratio of 1:2, to the appropriate amount of the Product A solution.

Treating Solution B

A treating solution (Treating Solution B) containing 3 weight % of the polyalkylene oxide polymer/polyester aminopropyltriethoxysilane hydrochloride mixture prepared as described above was prepared by, first, weighing out 50.3 grams of distilled water into a 6 ounce bottle, adding thereto 20 grams of Product B, and stirring for 5 minutes, then weighting out 340 grams of distilled water into a 16 ounce bottle, adding thereto 60 grams of the Product B dispersion prepared as described in the first step, and stirring for an additional 5 minutes.

Products and Treating Solutions, C, D, and E

Products C, D, and E were prepared according to the procedure described for Product B, using however as the polyalkylene oxide polymers, for C: $HO(CH_2CH_2O)_{4.1}H$, for D: $HO(CH_2CH_2O)_{13.2}H$, and for E: $HO(CH_2CH_2O)_{22.3}H$.

Treating Solutions, C, D, and E were prepared according to the procedure described above for Treating Solution B, utilizing however Products C, D, and E.

The following Table summarizes the effects of the treating solutions described above on the properties of treated fiber rovings before and after cure.

The tabularized comparison (Table I) of Treating Solution A results (those involving no polyalkylene oxide polymer) with Treating Solution B results (a similar system but containing polyalkylene oxide polymer according to the present invention) demonstrates that glass fibers treated according to the present invention are less subject to extractability and are much stiffer than are those treated with a comparable "control" system.

TABLE I

| Glass Fiber Treatment | Cure[1] | L.O.I.[2] | Extractability, %[3] | Stiffness (grams)[4] |
|---|---|---|---|---|
| Treating Solution A | no | 2.08 | 81.7 | 40 |
|  | yes | 2.18 | 55.0 | 56 |
| Treating Solution B | no | 1.84 | 50.0 | 78 |
|  | yes | 1.76 | 6.8 | 290 |
| Treating Solution C | no | 1.92 | 83.9 | 33.6 |
|  | yes | 1.55 | 21.9 | 76.8 |
| Treating Solution D | no | 3.22 | 20.8 | 41.6 |
|  | yes | 3.08 | 3.6 | 251 |
| Treating Solution E | no | 2.69 | 18.6 | 19.2 |
|  | yes | 2.38 | 2.1 | 292 |

[1] In this specific experiment, the cure consisted of heating the dried treated glass fibers at 285° F. in air in a circulating oven; A and B for eight hours and C, D, and E for sixteen hours.
[2] Loss on ignition, amount of treating material on the glass fiber determined by weighing before and after one hour ignition at 600° C.
[3] The wt. % of treatment removed by extraction for one hour by acetone in a soxhlet extractor. The intent of this test is to simulate the effect under actual use conditions of the monomeric styrene in a polyester resin on the glass fiber treatment during the fabrication of a composite.
[4] Test used to measure the relative stiffness of various treatments on glass fibers. Consists of a flexural type test. This data was generated using a one inch span of glass fiber roving and a test speed of 0.2 inches per minute.

Product F

Five parts by weight of a polyalkylene oxide polymer of the average formula $CH_3O(CH_2CH_2O)_{7.2}H$ was added to 100 parts by weight of the Product A solution.

Treating Solution F

A treating solution (Treating Solution F) containing 3 weight % of the polyalkylene oxide polymer/polyester aminopropyltriethoxysilane hydrochloride mixture prepared as described above was prepared by, first, weighing out 68.25 grams of distilled water into a 6 ounce bottle, adding thereto 31.75 grams of Product F, and stirring for 5 minutes, then weighing out 340 grams of distilled water into a 16 ounce bottle, adding thereto 60 grams of the Product F dispersion prepared as described in the first step, and stirring for an additional 5 minutes.

Product G

Ten parts by weight of a polyalkylene oxide polymer of the formula $CH_3O(CH_2CH_2O)_{7.2}H$ was added to 100 parts by weight of the Product A solution.

Treating Solution G

A treating solution (Treating Solution G) containing 3 weight % of the polyalkylene oxide polymer/polyester aminopropyltriethoxysilane hydrochloride mixture prepared as described above was prepared by, first, weighing out 69.09 grams of distilled water into a 6 ounce bottle, adding thereto 30.91 grams of Product G, and stirring for 5 minutes, then weighing out 340 grams of distilled water into a 16 ounce bottle, adding thereto 60 grams of the Product G dispersion prepared as directed in the first step, and stirring for an additional 5 minutes.

Table II demonstrates the effectiveness of the present invention in improving the stiffness and extractability properties of sized glass fibers.

TABLE II

| Glass Fiber Treatment | Cure[1] | L.O.I.[2] | Extractability, %[3] | Stiffness (grams)[4] |
|---|---|---|---|---|
| Treating Solution F | NO | 2.56 | 94.0 | 13 |

TABLE II-continued

| Glass Fiber Treatment | Cure[1] | L.O.I.[2] | Extractability, %[3] | Stiffness (grams)[4] |
|---|---|---|---|---|
| | YES | 2.29 | 57.0 | 48 |
| Treating Solution G | NO | 2.03 | 96.8 | 4 |
| | YES | 2.04 | 32.2 | 61 |

[1]In this specific experiment, the cure consisted of heating the dried treated glass fibers at 285° F. in air in a circulating oven for eight hours.
[2]Loss on Ignition, amount of treating material on the glass fiber determined by weighing before and after one hour ignition at 600° C.
[3]The wt. % of treatment removed by extraction for one hour by acetone in a soxhlet extractor. The intent of this test is to simulate the effect under actual use conditions of the monomeric styrene in a polyester resin on the glass fiber treatment during the fabrication of a composite.
[4]Test used to measure the relative stiffness of various treatments on glass fibers. Consists of a flexural type test. This data was generated using a one inch span of glass fiber roving and a test speed of 0.2 inches per minute.

What is claimed is:

1. A composition suitable for use in the treatment of glass fibers which comprises
a polyester polymer having a molecular weight of greater than 1000 and comprising units of the formulae

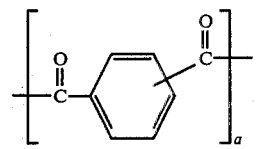

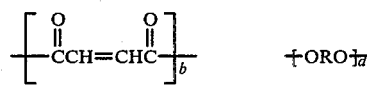 

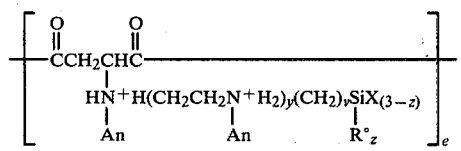

wherein R is a divalent hydrocarbon radical, R° is an alkyl, aryl, or aralkyl group, X is alkoxy, hydroxy, or divalent oxygen, y is 0 or 1, v is an integer of from 1 to 6, z is 2, 1, or 0, a is 0 or a mole fraction of from 0.004 to 0.6, b and e are mole fractions ranging from about 0.004 to about 0.6, and d is a mole fraction ranging from 0.4 to 0.6, with the proviso that d is greater than, equal to, or slightly less than the sum of a, b, and e, and An is anion of a monovalent acid, and from 10 weight % to 100 weight %, based upon the weight of said polyester polymer in the composition, of a polyalkylene oxide polymer of the formula

wherein E is hydrogen or an alkyl end-blocking group having up to 8 carbon atoms, m ranges from 0 to 50, n ranges from 0 to 20, and m+n must total at least 3.

2. A composition as in claim 1 wherein the polyester polymer consists essentially of units of the formulae

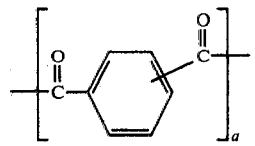

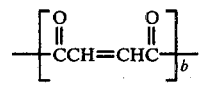 

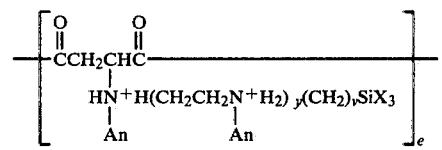

wherein R is a alkylene radical having from 2 to 6 carbon atoms, X is an alkoxy group having up to 8 carbon atoms, and a is a mole fraction of from 0.004 to 0.6, and wherein the polyalkylene oxide polymer is an ethylene oxide polymer.

3. A composition as in claim 2 wherein the polyester polymer consists essentially of units of the formulae

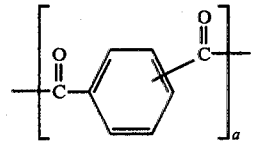

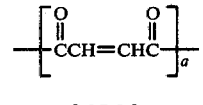 

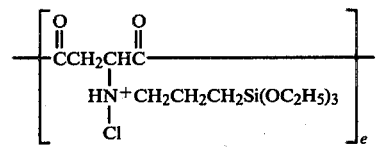

4. A composition as in claim 3 wherein the polyalkylene oxide polymer has the average formula $CH_3O(CH_2CH_2O)_{7.2}H$.

5. A composition which comprises a composition according to one of claims 1, 2, 3, or 4 dispersed in a major amount of water.

6. A method for treating glass fiber which comprises contacting said glass fiber with a composition according to claim 5.

7. A method as in claim 6 wherein, subsequent to contacting said glass fiber with said composition, the composition so treated is dryed.

8. A method as in claim 7 wherein the drying is carried out in air at an elevated temperature.

9. A glass fiber which has been treated by the method of claim 6.

10. An unsaturated polyester resin Sheet Molding Compound composite which contains glass fiber which has been treated by the method of claim 6.

* * * * *